US012031695B1

(12) United States Patent
Agarwal

(10) Patent No.: US 12,031,695 B1
(45) Date of Patent: Jul. 9, 2024

(54) EXTERIOR LIGHTING WATER REMOVAL VALVE

(71) Applicant: Goodrich Corporation, Charlotte, NC (US)

(72) Inventor: Ashish Kumar Agarwal, Bangalore (IN)

(73) Assignee: GOODRICH LIGHTING SYSTEMS, INC., Phoenix, AZ (US)

( * ) Notice: Subject to any disclaimer, the term of this patent is extended or adjusted under 35 U.S.C. 154(b) by 0 days.

(21) Appl. No.: 18/457,962

(22) Filed: Aug. 29, 2023

(30) Foreign Application Priority Data

Jul. 5, 2023 (IN) ............................. 202341045237

(51) Int. Cl.
*F21S 45/37* (2018.01)
*F21W 103/10* (2018.01)
*F21W 107/30* (2018.01)

(52) U.S. Cl.
CPC .......... *F21S 45/37* (2018.01); *F21W 2103/10* (2018.01); *F21W 2107/30* (2018.01)

(58) Field of Classification Search
CPC ............ F21S 45/37; F21S 45/30; F21S 45/33; F21W 2103/10; F21W 2107/30
USPC .................................................. 362/470, 547
See application file for complete search history.

(56) References Cited

U.S. PATENT DOCUMENTS 4,437,487 A * 3/1984 Marmon ................. F16K 27/07 251/339
4,463,774 A 8/1984 Gorges et al.
10,941,864 B2 3/2021 Hessling-Von Heimendahl et al.
2023/0133758 A1* 5/2023 Delpy ..................... F16K 24/04 73/865.8

* cited by examiner

*Primary Examiner* — Laura K Tso
(74) *Attorney, Agent, or Firm* — SNELL & WILMER L.L.P.

(57) ABSTRACT

A fluid removal assembly for an aircraft light is provided. The fluid removal assembly includes a condensate removal valve including a housing; a set of helical compression springs; and a stem disposed within the housing. The stem is configured to translate in a first direction responsive to the aircraft being pressurized and a first force, from the pressurization, forcing the stem to translate in the first direction; and translate in a second direction opposite the first direction responsive to the aircraft being depressurized and a second force from the set of helical compression springs forcing the stem to translate in the second direction. The condensate removal valve is configured to: responsive to an aircraft being depressurized, drain a fluid from one or more components of the aircraft light, the aircraft light being installed in the aircraft; and responsive to the aircraft being pressurized, maintain a pressure within the aircraft.

20 Claims, 9 Drawing Sheets

EXTERIOR LIGHTING WATER REMOVAL VALVE

FIELD CROSS-REFERENCE TO RELATED APPLICATIONS

This application claims priority to, and the benefit of, India Provisional Patent Application No. 202341045237, filed Jul. 5, 2023 (DAS code D67B) and titled "EXTERIOR LIGHTING WATER REMOVAL VALVE," which is incorporated by reference herein in its entirety for all purposes.

FIELD

The present disclosure generally relates to the field of aircraft lights and, more particularly, to removing water from exterior lighting of an aircraft.

BACKGROUND

Almost all aircraft are equipped with aircraft lights, including exterior aircraft lights, which are installed on the outside of the aircraft, and interior aircraft lights, which are installed within the aircraft. Exterior aircraft lights may include navigation lights, anti-collision strobe lights, flashing beacon lights, take-off lights, taxi lights, runway turn-off lights, landing lights, logo lights, cargo loading lights, wing scan lights, engine scan lights, and search lights. Interior aircraft lights may include cabin illumination lights, washroom illumination lights, galley illumination lights, aisle guidance lights, passenger reading lights, and exit sign lights.

SUMMARY

A fluid removal assembly for an aircraft light is disclosed. The fluid removal assembly includes a condensate removal valve. The condensate removal valve includes a housing; a set of helical compression springs; and a stem disposed within the housing, the stem configured to translate in a first direction responsive to the aircraft being pressurized and a first force, from pressurization, forcing the stem to translate in the first direction; and translate in a second direction opposite the first direction responsive to the aircraft being depressurized and a second force from the set of helical compression springs forcing the stem to translate in the second direction. The condensate removal valve is configured to, responsive to an aircraft being depressurized, drain a fluid from one or more components of the aircraft light, the aircraft light being installed in the aircraft; and, responsive to the aircraft being pressurized, maintain a pressure within the aircraft.

In various embodiments, the stem includes a proximal portion. In various embodiments, the first force is applied to a first side of the proximal portion. In various embodiments, the second force is applied to a second side of the proximal portion. In various embodiments, the stem includes a distal portion. In various embodiments, responsive to the stem translating in the first direction, the distal portion of the stem blocks a flow of the fluid from the one or more components of the aircraft light. In various embodiments, responsive to the stem translating in the second direction, the distal portion of the stem provides a pathway for the flow of the fluid from the one or more components of the aircraft light to an exterior of the aircraft.

In various embodiments, the condensate removal valve further includes an inlet drain tube, the inlet drain tube configured to provide a first pathway for a flow of the fluid from the one or more components to a distal portion of the housing. In various embodiments, the condensate removal valve further includes an outlet drain tube, the outlet drain tube configured to provide a second pathway for the flow of the fluid from the distal portion of the housing to an exterior of the aircraft.

In various embodiments, the condensate removal valve further includes a cap nut configured to couple to the housing and retain the stem within the housing. In various embodiments, the cap nut includes a void to allow the pressurization to act upon the stem.

Also disclosed herein is an aircraft light assembly. The aircraft light assembly includes a support board; a light source, arranged on the support board; internal electronics configured to operate the light source; and a condensate removal valve. The condensate removal valve includes a housing; a set of helical compression springs; and a stem disposed within the housing. The stem is configured to translate in a first direction responsive to the aircraft being pressurized and a first force, from pressurization, forcing the stem to translate in the first direction; and translate in a second direction opposite the first direction responsive to the aircraft being depressurized and a second force from the set of helical compression springs forcing the stem to translate in the second direction. The condensate removal valve is configured to, responsive to an aircraft being depressurized, drain a fluid from one or more components of the aircraft light assembly, the aircraft light assembly being installed in the aircraft; and, responsive to the aircraft being pressurized, maintain a pressure within the aircraft.

In various embodiments, the stem includes a proximal portion. In various embodiments, the first force is applied to a first side of the proximal portion. In various embodiments, the second force is applied to a second side of the proximal portion. In various embodiments, the stem includes a distal portion. In various embodiments, responsive to the stem translating in the first direction, the distal portion of the stem blocks a flow of the fluid from the one or more components of the aircraft light assembly. In various embodiments, responsive to the stem translating in the second direction, the distal portion of the stem provides a pathway for the flow of the fluid from the one or more components of the aircraft light assembly to an exterior of the aircraft.

In various embodiments, the condensate removal valve further includes an inlet drain tube, the inlet drain tube configured to provide a first pathway for a flow of the fluid from the one or more components to a distal portion of the housing. In various embodiments, the condensate removal valve further includes an outlet drain tube, the outlet drain tube configured to provide a second pathway for the flow of the fluid from the distal portion of the housing to an exterior of the aircraft.

In various embodiments, the condensate removal valve further includes a cap nut configured to couple to the housing and retain the stem within the housing. In various embodiments, the cap nut includes a void to allow the pressurization to act upon the stem.

Also disclosed herein is an aircraft. The aircraft includes an aircraft light assembly. The aircraft light assembly includes a support board; a light source, arranged on the support board; internal electronics configured to operate the light source; and a condensate removal valve, The condensate removal valve includes a housing; a set of helical compression springs; and a stem disposed within the housing. The stem is configured to translate in a first direction responsive to the aircraft being pressurized and a first force, from pressurization, forcing the stem to translate in the first direction; and translate in a second direction opposite the first direction responsive to the aircraft being depressurized and a second force from the set of helical compression springs forcing the stem to translate in the second direction. The condensate removal valve is configured to, responsive to the aircraft being depressurized, drain a fluid from one or more components of the aircraft light assembly, the aircraft light assembly being installed in the aircraft; and, responsive to the aircraft being pressurized, maintain a pressure within the aircraft.

In various embodiments, the stem includes a proximal portion. In various embodiments, the first force is applied to a first side of the proximal portion. In various embodiments, the second force is applied to a second side of the proximal portion. In various embodiments, the stem includes a distal portion. In various embodiments, responsive to the stem translating in the first direction, the distal portion of the stem blocks a flow of the fluid from the one or more components of the aircraft light assembly. In various embodiments, responsive to the stem translating in the second direction, the distal portion of the stem provides a pathway for the flow of the fluid from the one or more components of the aircraft light assembly to an exterior of the aircraft.

In various embodiments, the condensate removal valve further includes an inlet drain tube, the inlet drain tube configured to provide a first pathway for a flow of the fluid from the one or more components to a distal portion of the housing. In various embodiments, the condensate removal valve includes an outlet drain tube, the outlet drain tube configured to provide a second pathway for the flow of the fluid from the distal portion of the housing to an exterior of the aircraft.

In various embodiments, the condensate removal valve further includes a cap nut configured to couple to the housing and retain the stem within the housing. In various embodiments, the cap nut includes a void to allow the pressurization to act upon the stem.

The present disclosure may include any one or more of the individual features disclosed above and/or below alone or in any combination thereof.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
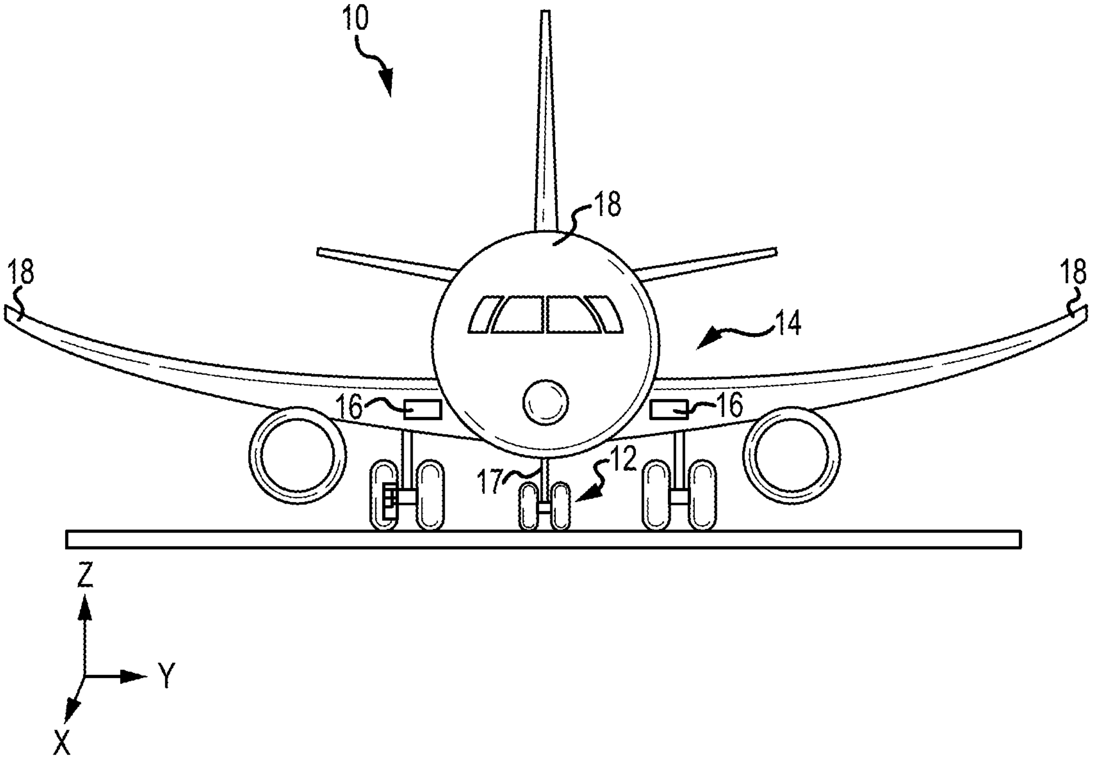
FIG. 1 illustrates an aircraft, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As stated previously, almost all aircraft are equipped with aircraft lights, including exterior aircraft lights, which are installed outside the aircraft, and interior aircraft lights, which are installed within the aircraft. Exterior aircraft lights may include navigation lights, anti-collision strobe lights, flashing beacon lights, take-off lights, taxi lights, runway turn-off lights, landing lights, logo lights, cargo loading lights, wing scan lights, engine scan lights, and search lights. Typically, exterior aircraft lights, such as the anti-collision strobe lights or flashing beacon lights, among others, include a metal housing that encloses internal electronics. However, this metal housing, may not be hermetically sealed and thus, the enclosure in which the metal housing resides needs to be drained of condensing water. In some instances, the metal housing may sit in pooling water for prolonged periods of time, and, in the other instances, the metal housing may be installed upside down.

Disclosed herein are systems and methods for draining condensed water from an exterior aircraft light. In various embodiments, a condensate removal valve is provided within the exterior aircraft light. In various embodiments, the condensate removal valve operates on a pressure difference principal with a spring balance. In typical aircrafts, there may be at least 0.3 bar pressure differential present between the interior and the exterior of the aircraft during each flight cycle that may be used to drain the condensed water. In various embodiments, the condensate removal valve includes a stepped stem with O rings, helical compression spring, drain valve housing, closing cap, seal, and the inlet and output cavity.

Referring now to FIG. 1, an aircraft 10 is illustrated, in accordance with various embodiments. In various embodiments, the aircraft 10 may comprise aircraft systems, for example, one or more landing gear such as landing gear 12, which may generally support the aircraft 10 when aircraft is not flying, allowing aircraft 10 to taxi, take off, and land without damage. Aircraft 10 may include one or more exterior lamps 14 such as, for example, landing lights 16, taxi lights 17, and navigation lights 18. Aircraft 10 may include any number of other exterior lamps 14 such as logo lights, runway turnoff lights, engine scan lights, anti-collision lights, strobe lights, beacon lights, cargo compartment lights, obstruction lights, landing gear lights, and/or the like.

Figure 2:
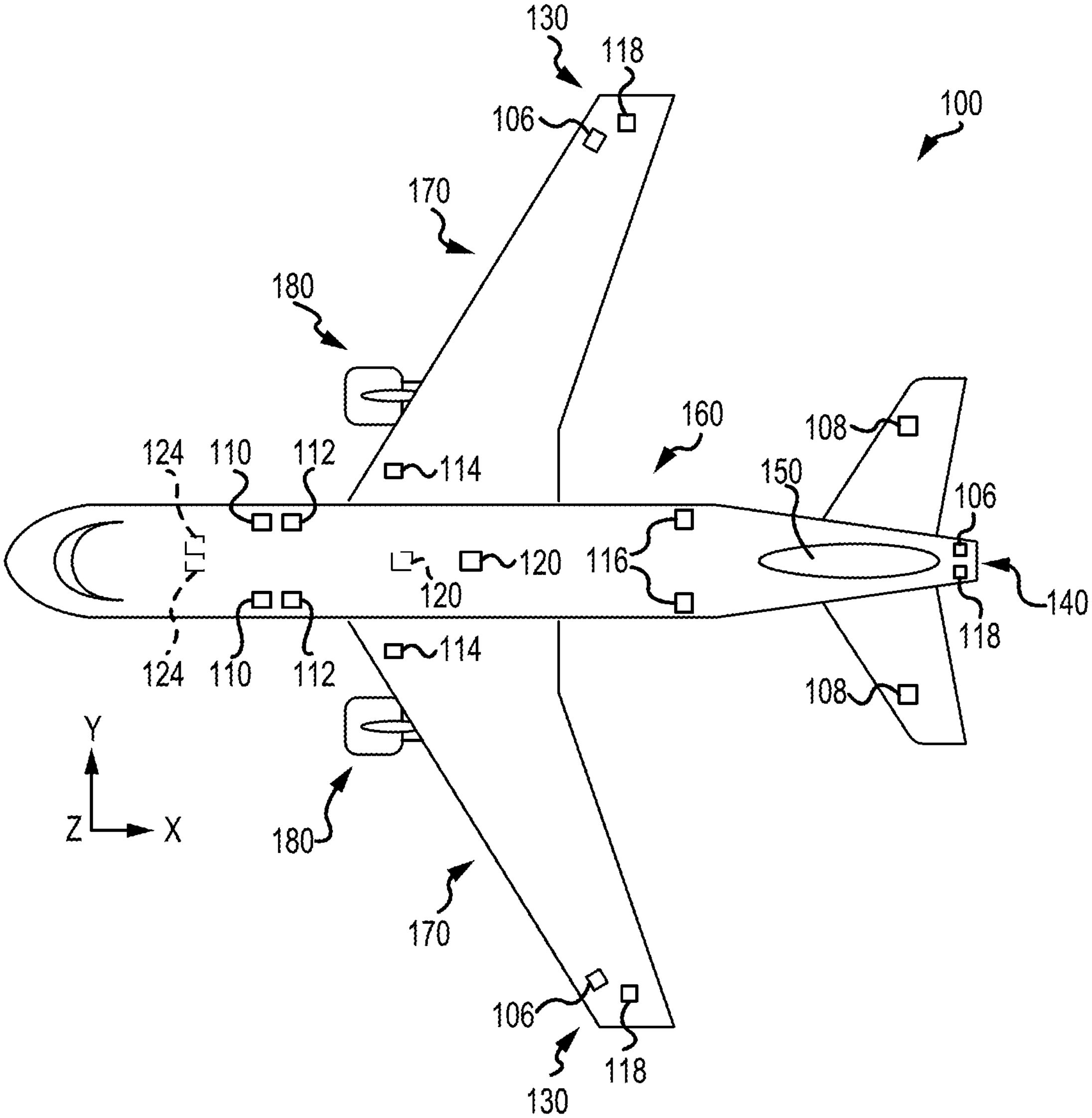
FIG. 2 illustrates a schematic top view of an aircraft equipped with exterior aircraft lights, in accordance with various embodiments.

Referring now to FIG. 2, a schematic top view of an aircraft 100, such as aircraft 10 of FIG. 1, from a position above the aircraft 100 is illustrated, in accordance with various embodiments. In various embodiments, the aircraft 100 is equipped with a variety of exterior aircraft lights 106-124. In various embodiments, the aircraft 100 may be equipped with three navigation lights 106, two logo lights 108, two wing scan lights 110, two engine scan lights 112, two runway turnoff lights 114, two cargo loading lights 116, three anti-collision strobe lights 118, two flashing anti-collision beacon lights 120, a landing light 122, and a take-off light 124. It is pointed out that these kinds of lights and their numbers are exemplary only. The aircraft 100 does not need to be equipped with all the exterior aircraft lights 106-124, which are depicted in FIG. 5, and the aircraft 100 may have additional lights, such as taxi lights, which are not shown in FIG. 5.

The three navigation lights 106 are positioned in the left and right wing tips 130 as well as in the tail 140 of the aircraft 100. In normal flight conditions, each one of the navigation lights 106 emits light in one of the colors green, red and white, thus indicating to the aircraft environment if they are looking at the port side, starboard side or tail side of the aircraft 100. The navigation lights 106 are normally switched on during all phases of the flight and in all flight conditions.

The logo lights 108 are directed to the vertical stabilizer 150 of the aircraft 100 and are provided for illuminating the same, in particular for illuminating the logo, which is commonly provided on the vertical stabilizer 150. The logo lights 108 are normally switched on for the entire duration of the flight during night flights. It is also possible that the logo lights 108 are only used during taxiing on the airport and are normally switched off during the flight.

The wing scan lights 110 and the engine scan lights 112 are positioned on the left and right sides of the aircraft fuselage 160, in front of the roots of the wings 170 of the aircraft 100. The wing scan lights 110 and the engine scan lights 112 are normally off during the flight and may be switched on periodically or upon reasonable cause by the pilots or by the aircrew, in order to check the wings 170 and the engines 180 of the aircraft 100.

The runway turn-off lights 114 are positioned in the roots of the wings 170. They are directed forwards and are normally switched off during the flight and switched on during taxiing, at least at night. The cargo loading lights 116 are positioned on the left and right sides of the aircraft fuselage 160, behind the wings 170 and in front of the tail structure of the aircraft 100. They are normally switched off during the flight of the aircraft 100.

The anti-collision strobe lights 118 are positioned in the left and right wing tips 130 as well as at the tail 140 of the aircraft 100. white anti-collision strobe lights 118 emit respective sequences of white light flashes during normal operation of the aircraft 100. It is also possible that the anti-collision strobe lights 118 are only operated during night and in bad weather conditions.

The anti-collision beacon lights 120 are positioned on the top and the bottom of the aircraft fuselage 160. They are arranged at the height of the wings 170 in the longitudinal direction of the aircraft 100. While one of the anti-collision beacon lights 120 is disposed on the top of the aircraft fuselage 160, the other one of the anti-collision beacon lights 120 is disposed on the bottom of the aircraft fuselage 160 and is therefore shown in phantom. The anti-collision beacon lights 120 are normally switched on during the flight. Their output is perceived as a sequence of red light flashes in a given viewing direction.

The landing light 122 and the take-off light 124 are attached to the front running gear of the aircraft 100, which is normally stored within the aircraft fuselage 160 and is deployed during landing, taxiing and take off. As the landing light 122 and the take-off light 124 are also arranged on the bottom of the aircraft 100, they are also shown in phantom in FIG. 5.

Figure 3A:
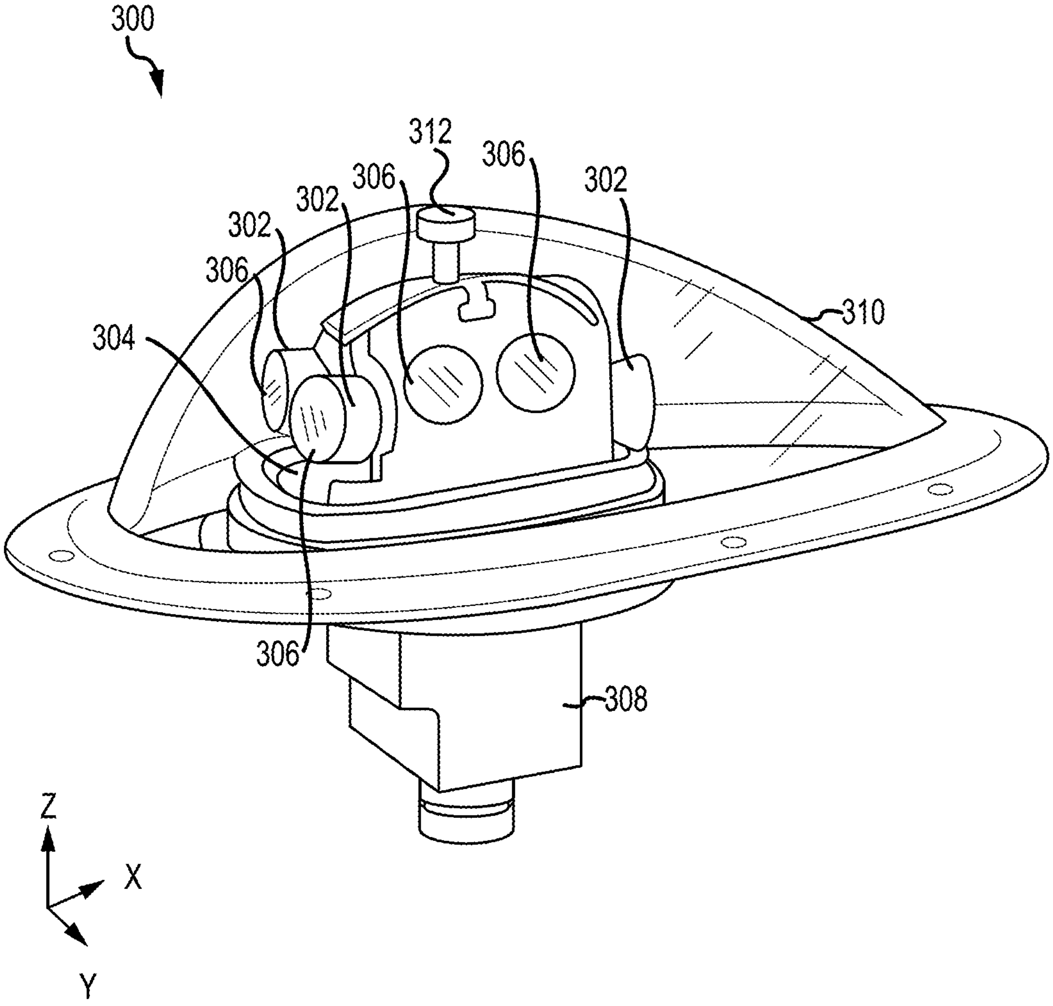
FIGS. 3A, 3B, and 3C illustrate an anti-collision strobe light, in accordance with various embodiments.
Figure 3B:
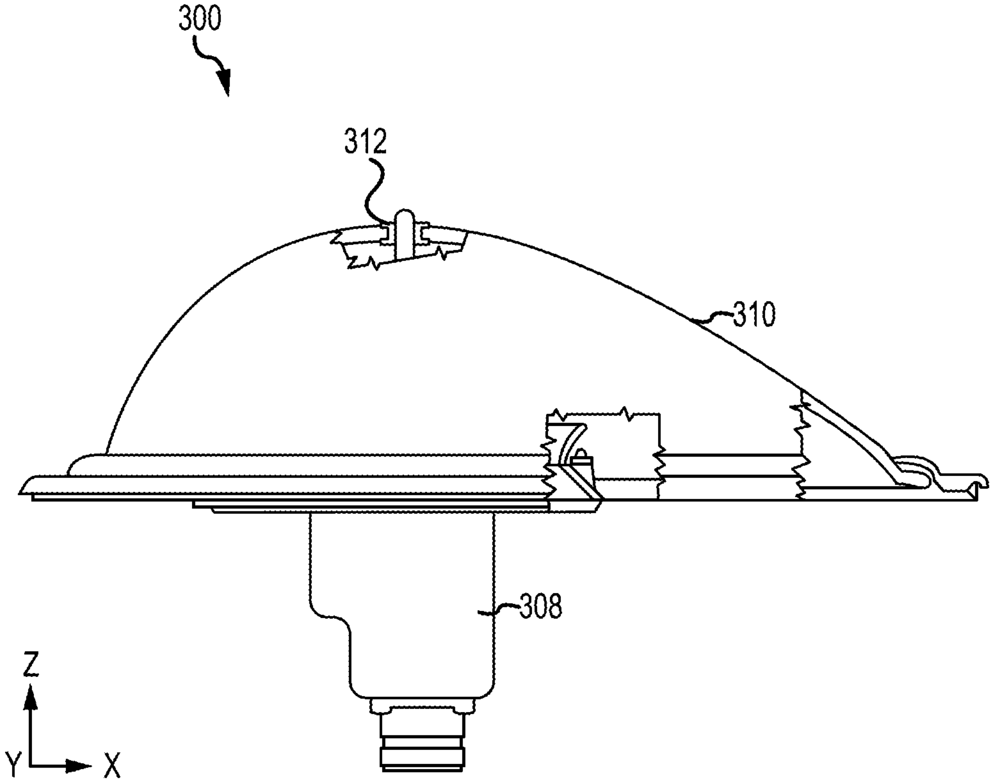
Figure 3C:
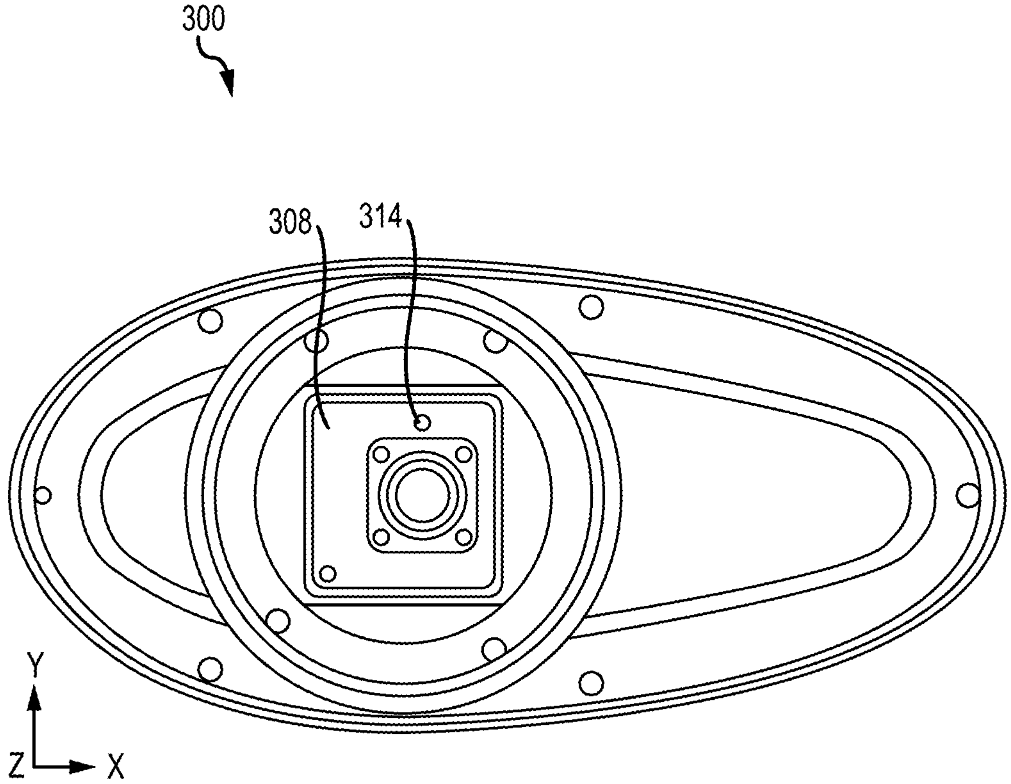

Referring now to FIGS. 3A, 3B, and 3C, an anti-collision strobe light 300, such as one of anti-collision strobe lights 118 of FIG. 2, is illustrated, in accordance with various embodiments. In various embodiments, the anti-collision strobe light 300, which may also be referred to as an aircraft light assembly, may include one or more light sources 302, which are arranged on a support board 304, for example a circuit board, in particular a printed circuit board ("PCB"). In various embodiments, the one or more light sources 302 may be light-emitting diodes (LEDs), or it may include an LED or a plurality of LEDs. In various embodiments, the anti-collision strobe light 300 further includes a first optical element 306, which is at least partially light transmissive. In various embodiments, the first optical element 306 is supported by the support board 304. In various embodiments, the first optical element 306 is in particular fixed to the support board 304. In various embodiments, the first optical element 306 is arranged at least partially over the one or more light sources 302, covering the one or more light sources 302, so that at least a portion of the light, which is emitted by the one or more light sources 302, when activated, passes through the first optical element 306.

In various embodiments, the anti-collision strobe light 300 may include a metal housing 308 in which internal electronics used to operate the anti-collision strobe light 300 are located. In various embodiments, the metal housing 308, while coupled to the aircraft, resides within an interior of the aircraft, while the attached to the one or more light sources 302, the support board 304, and the first optical element 306 reside exterior to the aircraft. In various embodiments, the one or more light sources 302, the support board 304, and the first optical element 306 are protected from outside elements via clear protective shield 310. In various embodiments, when the anti-collision strobe light 300 is installed on the bottom of the fuselage of the aircraft, water that may condense within the anti-collision strobe light 300 exits the anti-collision strobe light 300 through drain hole 312 in clear protective shield 310. In various embodiments, when the anti-collision strobe light 300 is installed on the top of the fuselage of the aircraft, any water that may condense within the anti-collision strobe light 300 collects within the metal housing 308 that houses the internal electronics and is only drained when a drain plug in drain hole 314 in the bottom of the metal housing 308 is manually removed. In various embodiments, while the drain plug is inserted in the drain hole 314, internal pressure is maintained within the aircraft between the interior of the aircraft and an exterior of the aircraft.

Figure 4A:
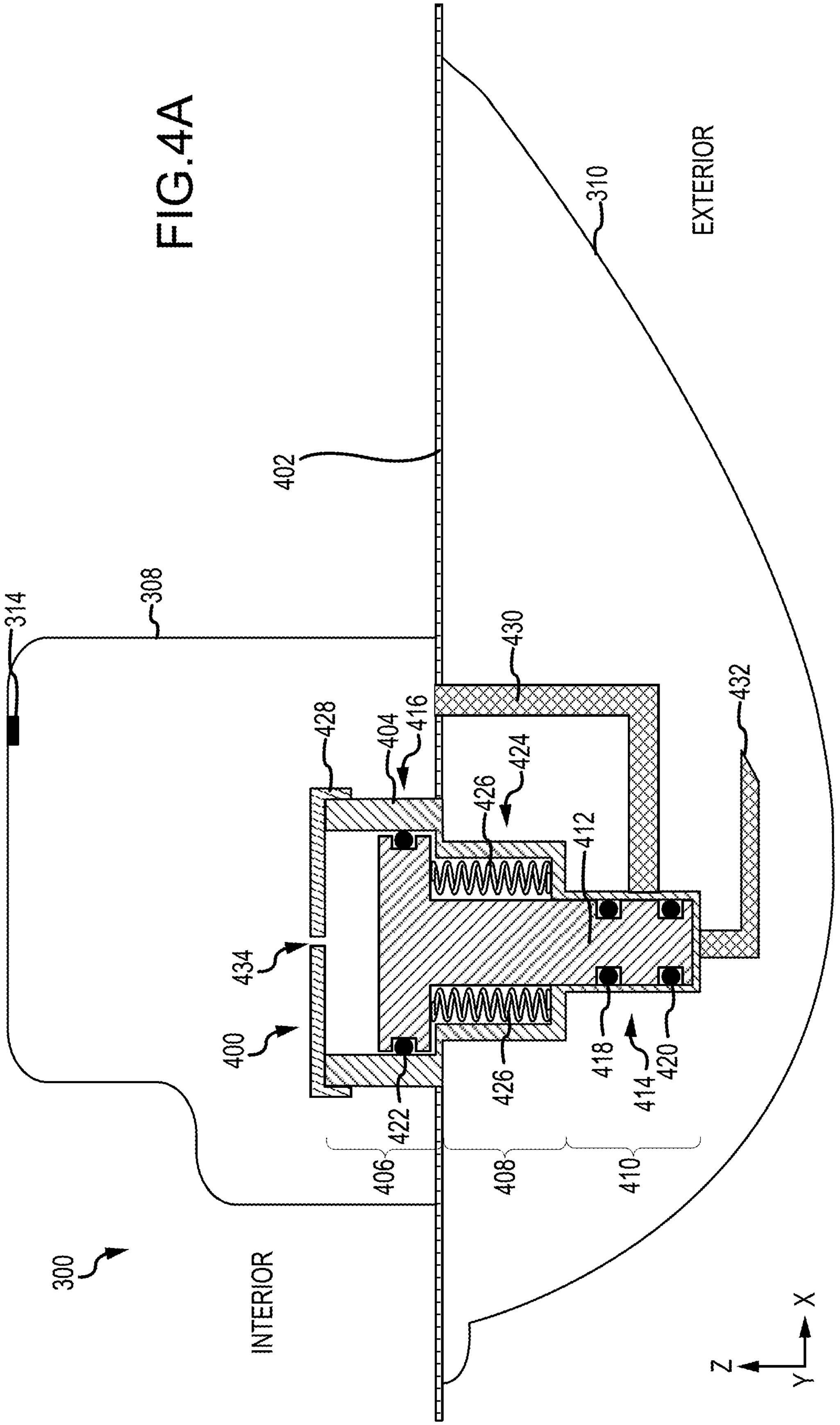
FIGS. 4A and 4B illustrate an anti-collision strobe light installed on a bottom of a fuselage of an aircraft and that incorporates a condensate removal valve, in accordance with various embodiments.
Figure 4B:
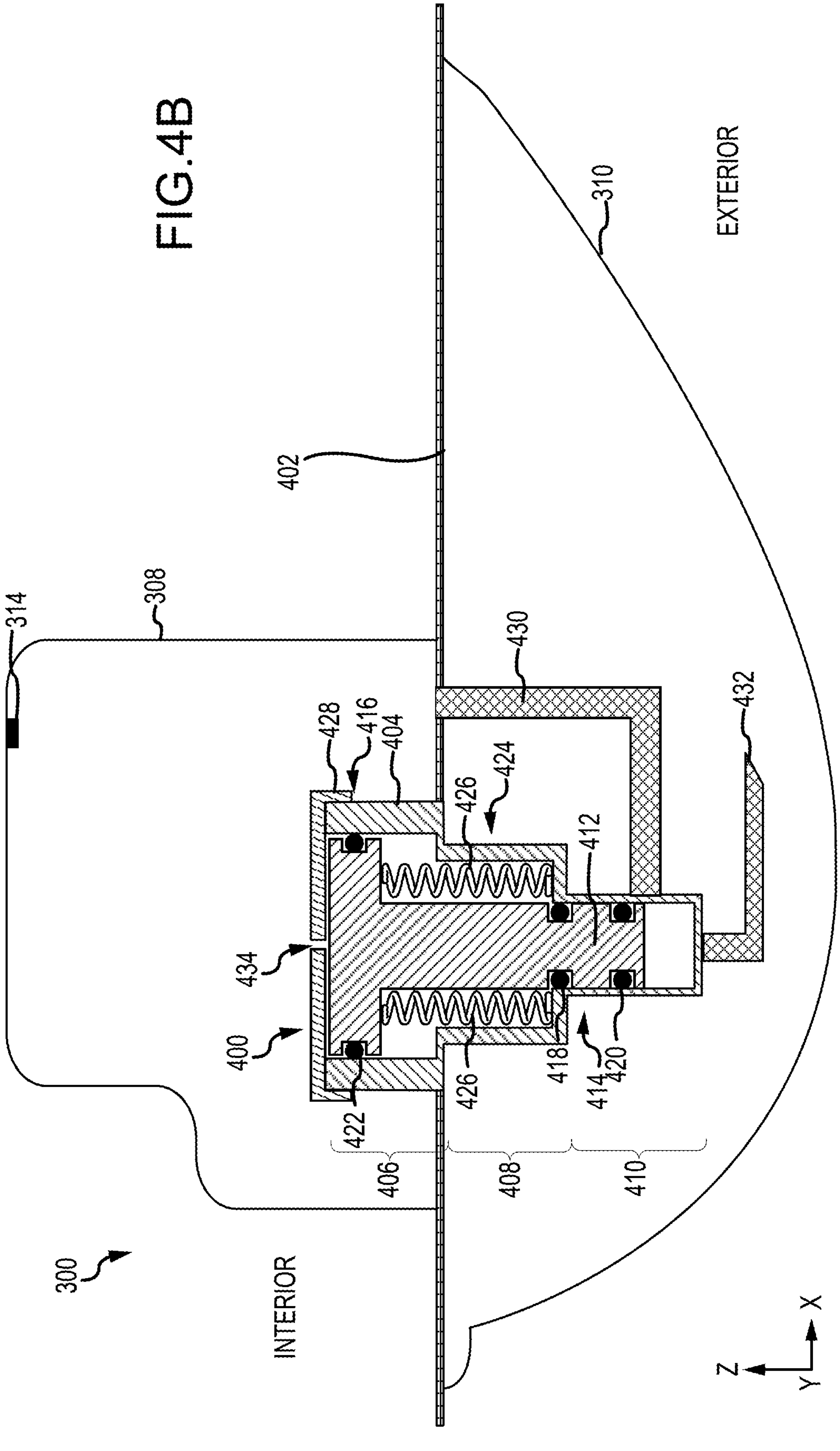

Referring now to FIGS. 4A and 4B, an anti-collision strobe light, such as anti-collision strobe lights 118 of FIG. 2, installed on a bottom of a fuselage of an aircraft and that incorporates a condensate removal valve 400 is illustrated, in accordance with various embodiments. In various embodiments, FIGS. 4A and 4B illustrate the condensate removal valve 400 in a closed position where the aircraft is pressurized, i.e. in flight, and in an open position where the aircraft is depressurized, i.e. on the ground, respectively. In various embodiments, the anti-collision strobe light 300 includes all the components illustrated in FIGS. 3A, 3B, and 3C including the metal housing 308 and the clear protective shield 310. In various embodiments, when installed, the metal housing 308 of the anti-collision strobe light 300 resides internal to the fuselage 402 and the one or more light sources 302 of FIG. 3A reside exterior to the fuselage 402 protected by the clear protective shield 310. In various embodiments, the condensate removal valve 400, which is illustrated in an enlarged view for illustration purposes where, in reality, the condensate removal valve 400 is of a miniature size. In various embodiments, the condensate removal valve 400, includes a cylindrical housing 404, which is partially exterior to the fuselage 402 and protected by the clear protective shield 310 and partially interior to the fuselage 402 within the metal housing 308. In various embodiments, the housing 404 includes a first (proximal) portion 406, a second (center) portion 408, and a third (distal) portion 410. In various embodiments, a cylindrical stem 412, which is "T" shaped, is positioned within the housing such that a distal end 414 of the stem 412 is positioned within the third portion 410 of the housing 404. In various embodiments, the distal end 414 of the stem 412 translates in a z-direction. In various embodiments, O-rings or gaskets 418 and 420 provide a seal between the distal end 414 of the stem 412 and an interior of the third portion 410 of the housing 404.

In various embodiments, a proximal end 416 of the stem 412 is positioned within the first portion 406 of the housing 404. In various embodiments, the proximal end 416 of the stem 412 translates in a z-direction. In various embodiments, O-ring or gasket 422 provides a seal between the proximal end 416 of the stem 412 and an interior of the first portion 406 of the housing 404. In various embodiments, a center portion 424 of the stem 412 is positioned within the second portion 408 of the housing 404 and is surrounded by a set of helical compression springs 426. In various embodiments, the stem 412 is held in place within the housing 404 by cylindrical cap nut 428 which coupled to the top, in the z-direction, of first portion 406.

In various embodiments, an inlet drain tube 430 is fluidly coupled between the metal housing 308 and the distal end 414 of the stem 412. In various embodiments, a first end of the inlet drain tube 430, which is coupled to the metal housing 308, provides a pathway for liquid that may condense within the metal housing 308 to exit the metal housing 308. In various embodiments, a second end of the inlet drain tube 430, which is coupled a side wall of the distal end 414 of the stem 412, delivers the condensate to the distal end 414 of the stem 412. In that regard, when the aircraft is in flight, a pressure differential is created between an interior of the aircraft and an exterior of the aircraft. In that regard, the pressure differential generates a force through open drain hole 314 and through void 434 in cylindrical cap nut 428 onto a topside the proximal end 416 of the stem 412, forcing the stem 412 downward in a negative z-direction. In various embodiments, by forcing the stem 412 downward in the negative z-direction, the distal end 414 of the stem 412 translates downward in the negative z-direction, providing a pressure block to maintain the pressure within the fuselage 402 and blocking condensate from flowing out the second end of the inlet drain tube 430 into the distal end 414 of the stem 412. Accordingly, in various embodiments, when the condensate removal valve 400 in the closed position, as illustrated in FIG. 4A, the condensate is held within the inlet drain tube 430.

In various embodiments, when the aircraft is on the ground, there is no pressure differential between an interior of the aircraft and an exterior of the aircraft. Accordingly, in various embodiments, the set of helical compression springs 426 exert a force on the underside of the proximal end 416 of the stem 412, forcing the stem 412 upward in a positive z-direction. In various embodiments, by forcing the stem 412 upward in the positive z-direction, the distal end 414 of the stem 412 translates upward in the positive z-direction, allowing the condensate to flow from the second end of the inlet drain tube 430 though the distal end 414 of the stem 412 and out through the outlet tube 432. Accordingly, in various embodiments, when the condensate removal valve 400 in the open position, as illustrated in FIG. 4B, the condensate is allowed to flow through the distal end 414 of the stem 412 to outlet tube 432. In that regard, in various embodiments, a first end of the outlet tube 432 is coupled to end, in the z-direction, of the distal end 414 of the stem 412. In various embodiments, when the condensate removal valve 400 in the open position, as illustrated in FIG. 4B, the condensate is allowed to flow out through a second end of the outlet tube 432, which may be coupled to a drain hole, such as drain hole 312 of FIGS. 3A and 3B. In various embodiments, the condensate may be allowed to exit into an area protected by clear protective shield 310 and out through a drain hole, such as drain hole 312 of FIGS. 3A and 3B.

Figure 5A:
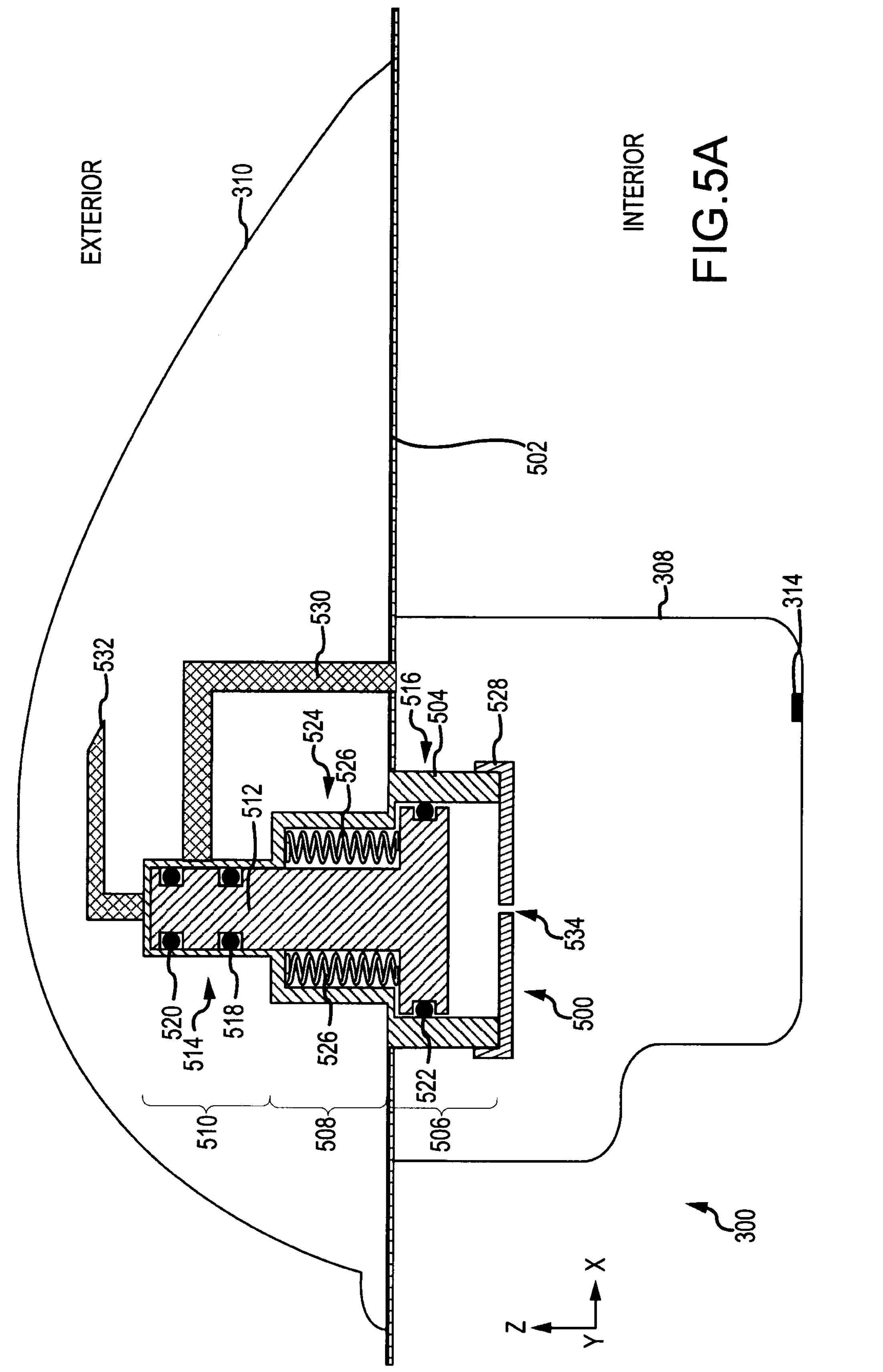
FIGS. 5A and 5B illustrate an anti-collision strobe light installed on a top of a fuselage of an aircraft and that incorporates a condensate removal valve, in accordance with various embodiments.
Figure 5B:
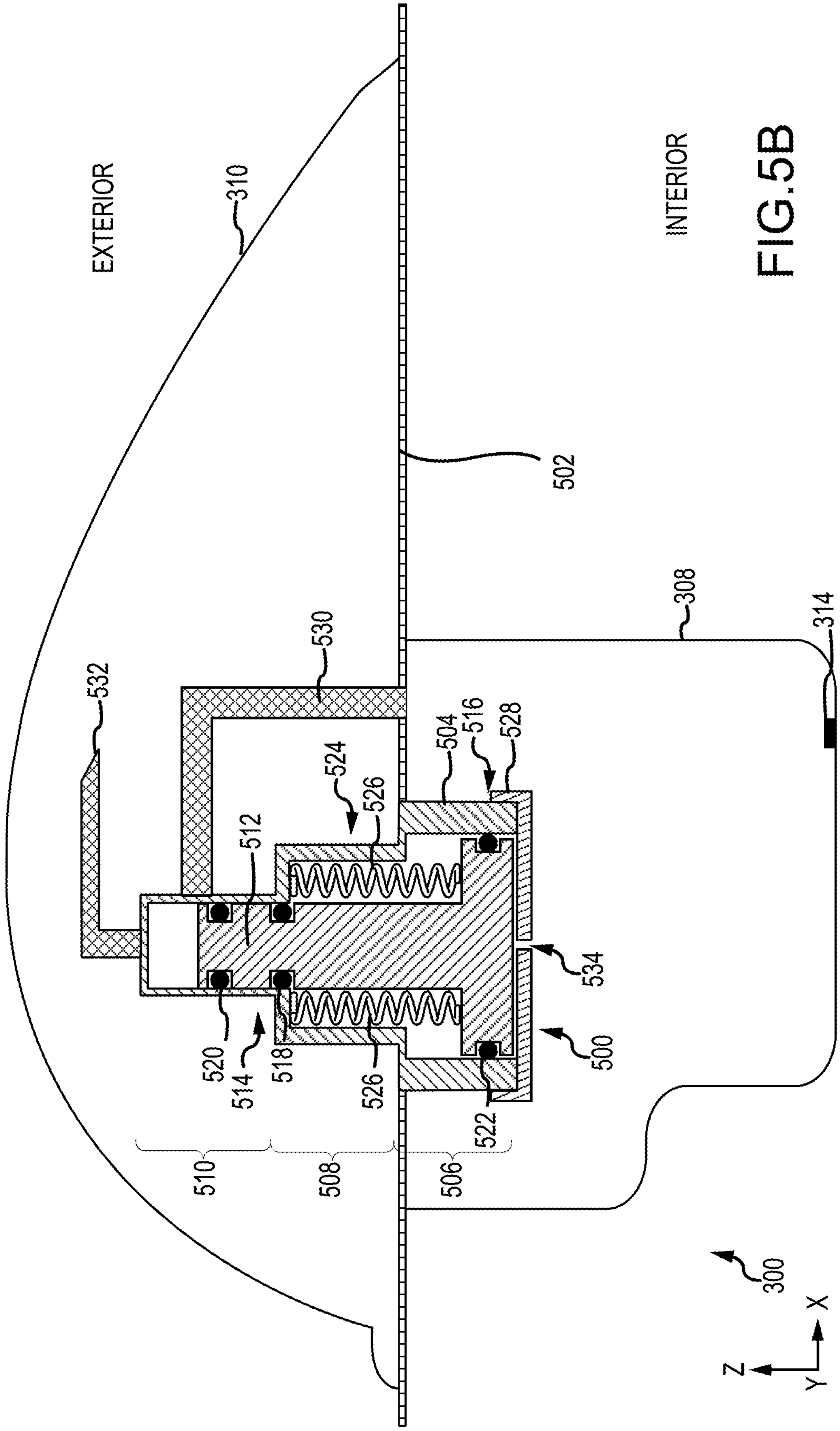

Referring now to FIGS. 5A and 5B, an anti-collision strobe light, such as anti-collision strobe lights 118 of FIG. 2, installed on a top of a fuselage of an aircraft and that incorporates a condensate removal valve 500 is illustrated, in accordance with various embodiments. In various embodiments, FIGS. 5A and 5B illustrate the condensate removal valve 500 in a closed position where the aircraft is pressurized, i.e. in flight, and in an open position where the aircraft is depressurized, i.e. on the ground, respectively. In various embodiments, the anti-collision strobe light 300 includes all the components illustrated in FIGS. 3A, 3B, and 3C including the metal housing 308 and the clear protective shield 310. In various embodiments, when installed, the metal housing 308 of the anti-collision strobe light 300 resides internal to the fuselage 502 and the one or more light sources 302 of FIG. 3A reside exterior to the fuselage 502 protected by the clear protective shield 310. In various embodiments, the condensate removal valve 500 is illustrated in an enlarged view for illustration purposes where, in reality, the condensate removal valve 500 is of a miniature size. In various embodiments, the condensate removal valve 500, includes a cylindrical housing 504, which is partially exterior to the fuselage 502 and protected by the clear protective shield 310 and partially interior to the fuselage 502 within the metal housing 308. In various embodiments, the housing 504 includes a first portion 506, a second portion 508, and a third portion 510. In various embodiments, a cylindrical stem 512, which is "T" shaped, is positioned within the housing such that a distal end 514 of the stem 512 is positioned within the third portion 510 of the housing 504.

In various embodiments, the distal end 514 of the stem 512 translates in a z-direction. In various embodiments, O-rings or gaskets 518 and 520 provide a seal between the distal end 514 of the stem 512 and an interior of the third portion 510 of the housing 504.

In various embodiments, a proximal end 516 of the stem 512 is positioned within the first portion 506 of the housing 504. In various embodiments, the proximal end 516 of the stem 512 translates in a z-direction. In various embodiments, O-ring or gasket 522 provides a seal between the proximal end 516 of the stem 512 and an interior of the first portion 506 of the housing 504. In various embodiments, a center portion 524 of the stem 512 is positioned within the second portion 508 of the housing 504 and is surrounded by a set of helical compression springs 526. In various embodiments, the stem 512 is held in place within the housing 504 by cylindrical cap nut 528 which is coupled to the top, in the z-direction, of first portion 506.

In various embodiments, the condensate removal valve 500 of FIGS. 5A and 5B is exactly the same as the condensate removal valve 400 of FIGS. 4A and 4B with one exception. In that regard, when the anti-collision strobe light 300 is installed on top the fuselage, the inlet drain tube 530 coupled between the metal housing 308 and the distal end 514 of the stem 512 and the outlet drain tube 532 the distal end 514 of the stem 512 perform no function. That is, condensate that may condense within the metal housing 308 to exit the metal housing 308 exits the metal housing 308 through open drain hole 314.

Nevertheless, in various embodiments, when the aircraft is in flight, a pressure differential is created between an interior of the aircraft and an exterior of the aircraft. In that regard, the pressure differential generates a force through open drain hole 314 and through void 534 in cylindrical cap nut 528 onto an underside the proximal end 516 of the stem 512, forcing the stem 512 upward in a positive z-direction. In various embodiments, by forcing the stem 512 upward in the positive z-direction, the distal end 514 of the stem 512 translates upward in the positive z-direction, providing a pressure block to maintain the pressure within the fuselage 402.

In various embodiments, when the aircraft is on the ground, there is no pressure differential between an interior of the aircraft and an exterior of the aircraft. Accordingly, in various embodiments, the set of helical compression springs 526 exert a force on the topside of the proximal end 516 of the stem 512, forcing the stem 512 downward in a negative z-direction. In various embodiments, by forcing the stem 512 downward in the negative z-direction, the distal end 514 of the stem 512 translates downward in the negative z-direction, providing an opening for air to flow through the outlet drain tube 532, the distal end 514 of the stem 512, and the inlet drain tube 530.

Thus, the various embodiments disclosed herein provide for draining condensed water from an exterior aircraft light. The above-described condensate removal valve in the anti-collision strobe light operates to drain condensate that may have collected in the anti-collision strobe light during ground operation but seals during flight operation. The condensate removal valve provides an active system without electrical power requirements and is a single design that operates in both an upright and upside-down configuration Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fluid removal assembly for an aircraft light, the fluid removal assembly comprising:

a condensate removal valve comprising:

a housing;

a set of helical compression springs; and a stem disposed within the housing, the stem configured to:

translate in a first direction responsive to the aircraft being pressurized and a first force, from pressurization, forcing the stem to translate in the first direction; and translate in a second direction opposite the first direction responsive to the aircraft being depressurized and a second force from the set of helical compression springs forcing the stem to translate in the second direction, wherein the condensate removal valve is configured to:

responsive to an aircraft being depressurized, drain a fluid from one or more components of the aircraft light, the aircraft light being installed in the aircraft; and responsive to the aircraft being pressurized, maintain a pressure within the aircraft.

2. The fluid removal assembly of claim 1, wherein the stem comprises a proximal portion, wherein the first force is applied to a first side of the proximal portion, and wherein the second force is applied to a second side of the proximal portion.

3. The fluid removal assembly of claim 1, wherein the stem comprises a distal portion, wherein, responsive to the stem translating in the first direction, the distal portion of the stem blocks a flow of the fluid from the one or more components of the aircraft light.

4. The fluid removal assembly of claim 3, wherein, responsive to the stem translating in the second direction, the distal portion of the stem provides a pathway for the flow of the fluid from the one or more components of the aircraft light to an exterior of the aircraft.

5. The fluid removal assembly of claim 1, wherein the condensate removal valve further comprises:

an inlet drain tube, the inlet drain tube configured to provide a first pathway for a flow of the fluid from the one or more components to a distal portion of the housing; and an outlet drain tube, the outlet drain tube configured to provide a second pathway for the flow of the fluid from the distal portion of the housing to an exterior of the aircraft.

6. The fluid removal assembly of claim 1, wherein the condensate removal valve further comprises:

a cap nut configured to couple to the housing and retain the stem within the housing.

7. The fluid removal assembly of claim 6, wherein the cap nut comprises a void to allow the pressurization to act upon the stem.

8. An aircraft light assembly, comprising:

a support board;

a light source, arranged on the support board;

internal electronics configured to operate the light source; and a condensate removal valve, the condensate removal valve comprising:

a housing;

a set of helical compression springs; and a stem disposed within the housing, the stem configured to:

translate in a first direction responsive to the aircraft being pressurized and a first force, from pressurization, forcing the stem to translate in the first direction; and translate in a second direction opposite the first direction responsive to the aircraft being depressurized and a second force from the set of helical compression springs forcing the stem to translate in the second direction, wherein the condensate removal valve is configured to:

responsive to an aircraft being depressurized, drain a fluid from one or more components of the aircraft light assembly, the aircraft light assembly being installed in the aircraft; and responsive to the aircraft being pressurized, maintain a pressure within the aircraft.

9. The aircraft light assembly of claim 8, wherein the stem comprises a proximal portion, wherein the first force is applied to a first side of the proximal portion, and wherein the second force is applied to a second side of the proximal portion.

10. The aircraft light assembly of claim 8, wherein the stem comprises a distal portion, wherein, responsive to the stem translating in the first direction, the distal portion of the stem blocks a flow of the fluid from the one or more components of the aircraft light assembly.

11. The aircraft light assembly of claim 10, wherein, responsive to the stem translating in the second direction, the distal portion of the stem provides a pathway for the flow of the fluid from the one or more components of the aircraft light assembly to an exterior of the aircraft.

12. The aircraft light assembly of claim 8, wherein the condensate removal valve further comprises:

an inlet drain tube, the inlet drain tube configured to provide a first pathway for a flow of the fluid from the one or more components to a distal portion of the housing; and an outlet drain tube, the outlet drain tube configured to provide a second pathway for the flow of the fluid from the distal portion of the housing to an exterior of the aircraft.

13. The aircraft light assembly of claim 8, wherein the condensate removal valve further comprises:

a cap nut configured to couple to the housing and retain the stem within the housing.

14. The aircraft light assembly of claim 13, wherein the cap nut comprises a void to allow the pressurization to act upon the stem.

15. An aircraft, comprising:

an aircraft light assembly, the aircraft light assembly comprising:

a support board;

a light source, arranged on the support board;

internal electronics configured to operate the light source; and a condensate removal valve, the condensate removal valve comprising:

a housing;

a set of helical compression springs; and a stem disposed within the housing, the stem configured to:

translate in a first direction responsive to the aircraft being pressurized and a first force, from pressurization, forcing the stem to translate in the first direction; and translate in a second direction opposite the first direction responsive to the aircraft being depressurized and a second force from the set of helical compression springs forcing the stem to translate in the second direction, wherein the condensate removal valve is configured to:

responsive to the aircraft being depressurized, drain a fluid from one or more components of the aircraft light assembly, the aircraft light assembly being installed in the aircraft; and responsive to the aircraft being pressurized, maintain a pressure within the aircraft.

16. The aircraft of claim 15, wherein the stem comprises a proximal portion, wherein the first force is applied to a first side of the proximal portion, and wherein the second force is applied to a second side of the proximal portion.

17. The aircraft of claim 15, wherein the stem comprises a distal portion, wherein, responsive to the stem translating in the first direction, the distal portion of the stem blocks a flow of the fluid from the one or more components of the aircraft light assembly.

18. The aircraft of claim 17, wherein, responsive to the stem translating in the second direction, the distal portion of the stem provides a pathway for the flow of the fluid from the one or more components of the aircraft light assembly to an exterior of the aircraft.

19. The aircraft of claim 15, wherein the condensate removal valve further comprises:

an inlet drain tube, the inlet drain tube configured to provide a first pathway for a flow of the fluid from the one or more components to a distal portion of the housing; and an outlet drain tube, the outlet drain tube configured to provide a second pathway for the flow of the fluid from the distal portion of the housing to an exterior of the aircraft.

20. The aircraft of claim 19, wherein the condensate removal valve further comprises:

a cap nut configured to couple to the housing and retain the stem within the housing, wherein the cap nut comprises a void to allow the pressurization to act upon the stem.

* * * * *